United States Patent
Peng et al.

(10) Patent No.: US 7,160,525 B1
(45) Date of Patent: Jan. 9, 2007

(54) MONODISPERSE NOBLE METAL NANOCRYSTALS

(75) Inventors: Xiaogang Peng, Fayetteville, AR (US); Lin Song Li, Fayetteville, AR (US); Nikhil Jana, Singapore (SG)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 10/965,685

(22) Filed: Oct. 14, 2004

Related U.S. Application Data

(60) Provisional application No. 60/511,183, filed on Oct. 14, 2003.

(51) Int. Cl.
| | | |
|---|---|---|
| C01G 5/00 | (2006.01) | |
| C01G 7/00 | (2006.01) | |
| C01G 51/00 | (2006.01) | |
| C01G 55/00 | (2006.01) | |

(52) U.S. Cl. .............................. 423/1; 423/22; 423/23; 423/24; 423/138; 423/139

(58) Field of Classification Search ................. 423/22, 423/23, 28, 24, 1, 138, 139; 516/116, 122; 75/371

See application file for complete search history.

(56) References Cited

U.S. PATENT DOCUMENTS

| | | | |
|---|---|---|---|
| 6,103,868 A | 8/2000 | Heath et al. | |
| 6,262,129 B1 * | 7/2001 | Murray et al. | 516/33 |
| 6,379,635 B1 * | 4/2002 | O'Brien et al. | 423/87 |
| 6,572,673 B1 * | 6/2003 | Lee et al. | 75/362 |
| 6,645,444 B1 * | 11/2003 | Goldstein | 423/1 |
| 6,872,249 B1 * | 3/2005 | Peng et al. | 117/68 |
| 2002/0066401 A1 | 6/2002 | Peng et al. | |
| 2004/0089101 A1 | 5/2004 | Winter et al. | |
| 2004/0101976 A1 | 5/2004 | Peng et al. | |

OTHER PUBLICATIONS

Brust, M., et al., "Synthesis of thiol-derivatised gold nanoparticles in a two-phase liquid-liquid system," *JCS, Chem. Comm.*, 1994, 801-802.

Collier, C., et al., Reversible tuning of silver quantum dot monolayers through the metal-insulator transition, *Science*, 1997, 277:1978-1981.

Leff, D. et al., "Synthesis and characterization of hydrophobic, organically-soluble gold nanocrystals functionalized with primary amines," *Langmuir*, 1996, 12: 4723-4730.

Cliffel, D. et al., "Mercaptoammonium-monolayer-protected, water-soluble gold, silver, and palladium clusters," *Langmuir*, 2000, 16: 9699-9702.

Turkevich, J. et al., "A study of the nucleation and growth processes in the synthesis of colloidal gold," *Disc. Faraday Soc.* 1951, 11: 55-75.

(Continued)

*Primary Examiner*—H. Thi Le
(74) *Attorney, Agent, or Firm*—Medicus Associates; James H. Meadows

(57) ABSTRACT

Nanoparticle compositions of noble metals, and methods of making them, are described. The nanoparticle compositions are made by reacting a salt or complex of a noble metal, such as Au, Ag, Cu or Pt, with a weak ligand, and a reducing agent, in a single liquid phase. The noble metal is typically provided as a halide or carboxylate. The ligand is preferably a fatty acid or aliphatic amine. The reducing agent is preferably a borohydride reagent, hydrazine, or a mixture thereof. Nanocrystals in the size range of 1 nm to 20 nm are produced, and can be made in substantially monodisperse form.

19 Claims, 7 Drawing Sheets

OTHER PUBLICATIONS

Wallenberg, L. R., et al., "On the crystal structure of small gold crystals and large gold clusters," *Surf. Sci.*, 1985, 156: 256-64.

Teranishi, T., et al., "Synthesis of monodisperse gold nanoparticles using linear polymers as protective agents," *Adv. Mater.*, 1998, 10: 596-599.

Green, M., et al., "A simple one phase preparation of organically capped gold nanocrystals," *Chem. Commun.*, 2000, 183-184.

Stoeva, S., et al., "Gram-scale synthesis of monodisperse gold colloids by the solvated metal atom dispersion method and digestive ripening and their organization into two- and three-dimensional structures," *JACS*, 2002, 124: 2305-2311.

Murphy, C., et al., "Controlling the aspect ratio of inorganic nanorods and nanowires," *Adv. Mater.*, 2002, 14: 80-82.

Brown, L. et al., "Controlled growth of gold nanoparticles during ligand exchange," *JACS*, 1999, 121:882-883.

Zhong, C. et al., "Size and shape evolution of core-shell nanocrystals," *Chem. Commun.*, 1999, 1211-1212.

Lin, X. et al., "Digestive ripening, nanophase segregation and superlattice formation in gold nanocrystal colloids," *J. Nanopart. Res.*, 2000, 2:157-164.

Shimizu, T., et al., "Size evolution of alkanethiol-protected gold nanoparticles by heat treatment in the solid state," *J. Phys. Chem. B*, 2003, 107:2719-2724.

Ahmadi, T. et al., "Shape-controlled synthesis of colloidal platinum nanoparticles," *Science*, 1996, 272: 1924-1926.

Watzky, M., et al., "Transition metal nanocluster formatin kinetic and mechanistic studies. A new mechanism when hydrogen is the reductant: slow, continuous nucleation and fast autocatalytic surface growth," *JACS*, 1997, 119: 10382-10400.

Courty, A., et al., "Supra Crystals made of nanocrystals," *Adv. Mater.*, 2001, 13: 254-258.

Ziegler, K., et al., "Synthesis of organic monolayer-stabilized copper nanocrystals in supercritical water," *JACS*, 2001, 123: 7797-7803.

Filankembo, A., et al., "Is the anion the major parameter in the shape control of nanocrystals?" *J. Phys. Chem. B*, 2003, 107: 7492-7500.

Murray, C., et al., "Synthesis and characterization of nearly monodisperse CdE (E=S, Se, Te) semiconductor nanocrystallites," *JACS*, 1993, 115: 8706-8715.

Peng, X., et al., "Kinetics of II-VI and III-V colloidal semiconductor nanocrystal growth: "Focusing" of size distributions," *JACS*, 1998, 120: 5343-5344.

Peng, Z. et al, "Formation of high-quality CdTe, CdSe, and CdS nanocrystals using CdO as precursor," *JACS*, 2001, 123: 183-184.

Qu, L., et al., "Alternative routes toward high quality CdSe nanocrystals," *Nano Lett.*, 2001, 1: 333-337.

Yu, W. et al., "Formation of High-quality CdS and other II-VI semiconductor nanocrystals in noncoordinating solvents: tunable reactivity of monomers," *Angew. Chemie Int. Ed.*, 2002, 41: 2368-2371.

Yu, W. et al., "Experimental determination of the extinction coefficient of CdTe, CdSe, and CdS nanocrystals," *Chem. Mater.*, 2003, 15: 2854-2860.

* cited by examiner

US 7,160,525 B1

MONODISPERSE NOBLE METAL NANOCRYSTALS

CROSS-REFERENCE TO RELATED APPLICATION

This application claims the benefit of U.S. Provisional Application 60/511,183, filed Oct. 14, 2003, the disclosure of which is incorporated herein by reference.

TECHNICAL FIELD OF THE INVENTION

The present invention relates to compositions of matter comprising colloidal nanocrystals, methods of making these compositions, methods for using these compositions, and articles of manufacture comprising these colloidal nanocrystals.

BACKGROUND OF THE INVENTION

Colloidal nanoparticles are nanometer-sized solid particles that are of interest in many advanced industrial applications. Generally, colloidal nanoparticles include colloidal nanocrystals as well as amorphous particles, and can comprise either inorganic or organic solids. The term "nanometer-sized" is typically used to refer to particles with an approximate size range between about 1 nm to about 1000 nm in diameter (one nanometer is $10^{-9}$ meter). More typically, "nanometer-sized" refers to an approximate size range between about 1 nm to about 100 nm in diameter.

The "noble metals" include Cu, Ag, Au, Pt, Pd, and sometimes Ir, and are referred to as such because they are somewhat resistant to oxidation. Noble metal nanocrystals, including gold, silver, copper, and platinum, play a wide range of roles in diverse applications of science and technology, such as chemical catalysis, catalysts for the growth of nanowires, nanomedicines, nanoelectronics, and the like. Therefore, control of the noble metal nanocrystal size and size distribution are of great interest to enhance their utility in these applications.

Gold and other noble metal nanocrystals play important roles in many different branches of science and technology. For most applications, the size and size distribution control of nanocrystals are of key importance. At present, the Brust method (Brust, M., et al., *Chem. Comm.*, 1994, 801–802), a two-phase approach, and its variations (Collier, C., et al., *Science*, 1997, 277:1978–1981; Leff, D. et al., *Langmuir* 1996, 12: 4723–4730; Cliffel, D. et al., *Langmuir*, 2000, 16: 9699–9702) are the most popular synthetic schemes in this field, although certain other approaches are available. (See, e.g., Turkevich, J. et al. *Disc. Faraday Soc.* 1951, 11: 55–75; Wallenberg, L. R., et al., *Surf. Sci.*, 1985, 156: 256–64; Teranishi, T., et al., *Adv. Mater.*, 1998, 10: 596–599; Green, M., et al., *Chem. Commun.*, 2000, 183–184; Stoeva, S., et al., *JACS*, 2002, 124: 2305–2311; Murphy, C., et al., *Adv. Mater.*, 2002, 14: 80–82) Among these methods, the citrate reduction method in aqueous solution (Turkevich, J. et al. *Disc. Faraday Soc.* 1951, 11: 55–75) has attracted significant attention. However, the nanocrystals can only be produced in a very low concentration, about 10–1000 times lower than that for the Brust method and its variations.

However, the size range of nanocrystals available from the Brust method is limited to between about 1 and about 4 nm, and the nanocrystal size distribution is also broad. Some post-synthesis treatments, such as ligand exchange (Brown, L. et al., *JACS*, 1999, 121: 882–883) and thermal annealing (Zhong, C. et al., *Chem. Commun.*, 1999, 1211–1212; Lin, X. et al., *Nanopart. Res.*, 2000, 2: 157–164; Shimizu, T., et al., *J. Phys. Chem. B*, 2003, 107: 2719–2724) are reported to improve the size distribution of gold (Au) nanocrystals formed through either the Brust method or other synthetic approaches. Another drawback of the Brust method is that the resulting nanocrystals are coated with a monolayer of strongly coordinating ligands, thiols, which makes it difficult to carry out the nanocrystals surface modification and functionalization needed for certain purposes.

In comparison to gold nanocrystals, synthesis of other noble metal nanocrystals is even less developed (Collier, C. et al., ibid; Ahmadi, T. et al., *Science*, 1996, 272: 1924–1926; Watzky, M., et al., *JACS*, 1997, 119: 10382–10400; Courty, A., et al., *Adv. Mater.*, 2001, 13: 254–258; Ziegler, K., et al., *JACS*, 2001, 123: 7797–7803; Filankembo, A., et al., *J. Phys. Chem. B*, 2003, 107,: 7492–7500).

In the patent literature, U.S. Pat. No. 6,645,444 (issued to Goldstein) reports copper nanocrystals having a particle size of 3 nm, but does not discuss the dispersity of the nanocrystals. The reported method entails dissolution of copper chloride and dodecylamine ligand in water. Hexane is layered onto the aqueous solution and some of the blue flocculent goes into the hexane phase. The two phase system is reduced with sodium borohydride in water to yield a reddish-brown hexane phase that contains the copper nanocrystals. This reference also reports that silver nanocrystals can be produced by a similar method.

U.S. Pat. No. 6,262,129 (issued to Murray et al.) describes a method of making nanoparticles under an inert atmosphere, which employs a phosphine ligand for the metal. U.S. Pat. No. 6,103,868 (issued to Heath et al.) reports the formation of functionalized Au, Ag, and Pt nanoparticles having a relatively narrow size distribution in the range of 1 to 20 nm. This reference employs a phase transfer agent capable of forming micelles, i.e., a bi-phasic method. U.S. Patent Publication 2004/0089101 reports making monodisperse copper nanocrystals that are passivated with a positively charged nitrogen-containing agent.

The formation of certain nearly monodisperse semiconductor nanocrystals has been reported by an organometallic approach (Murray, C., et al., *JACS*, 1993, 115: 8706–8715; Peng, X., et al., *JACS*, 1998, 120: 5343–5344) and alternative approaches (Peng, Z. et al, *JACS*, 2001, 123: 183–184; Qu, L., et al., *Nano Lett.*, 2001, 1: 333–336; Yu, W. et al., *Angew. Chemie Int. Ed.*, 2002, 41: 2368–2371). It is reported that one feature of this synthesis, as revealed by mechanism studies (Yu, W. et al., *Chem. Mater.*, 2003, ASAP article), is maintaining balanced nucleation and growth by tuning the activity of the precursors. The knowledge learned in the synthesis of semiconductor nanocrystals is unlikely to be applicable for the Brust method because it is a bi-phasic process, for which both nucleation and growth occur at the interface of the two liquid phases.

Also, while significant progress has been made in the development of high quality and monodisperse nanocrystals of the cadmium chalcogenides, the quality of zinc chalcogenides nanocrystals using alternative approaches is significantly lower than that of cadmium chalcogenides nanocrystals. Further, the preparation of highly monodisperse and high quality magnetic nanocrystals such as iron oxide nanocrystals is of great interest for their applications in a variety of technological roles. The development of these materials has lagged behind the semiconductor materials.

An object of the present invention is to develop new methods to synthesize and stabilize, high quality, highly monodisperse, nanocrystalline materials. Monodisperse size distributions of noble metal nanocrystals are expected to exhibit useful optical, magnetic, electronic, or catalytic properties.

SUMMARY OF THE INVENTION

The present invention addresses limitations in preparing monodisperse nanocrystals by providing new synthetic strategies for their preparation and stabilization. The methods disclosed herein are applicable to preparing novel compositions comprising highly monodisperse noble metal nanoparticles, including nanocrystals of gold, silver, copper, platinum, and the like. As used herein, the term "substantially monodisperse", and equivalents thereof, refers practically to a size distribution pattern for the "as prepared" nanocrystallite reaction products with a standard deviation from the mean particle size of about 10%.

In one aspect of the invention, novel compositions comprising substantially monodisperse nanocrystals of gold, silver, copper, and platinum are provided. A representative composition contains a plurality of nanocrystals between about 1 nm and about 50 nm, and more typically between about 1 nm and 20 nm, in diameter. These compositions are useful for a number of articles of manufacture comprising these substantially monodisperse nanocrystals.

In another aspect, a single phase method of synthesizing substantially monodisperse noble metal nanocrystals is contemplated, which comprises combining, in a suitable solvent, (i) a noble metal complex, compound, or salt; (ii) at least one weak ligand for the metal complex; and (iii) at least one reducing agent. Nanocrystals readily form and can then be isolated from the solvent. Preferably, a noble metal complex or salt is selected from a complex, compound, or salt of gold, silver, copper, or platinum, and typically is a complex or salt of a halide or a carboxylate. A weak ligand is preferably a fatty acid, an aliphatic amine, or a mixture thereof; and a reducing agent is preferably a borohydride reagent, hydrazine reagent, or mixture thereof. Preferably, a non-aqueous solvent and a surfactant are employed in this single phase synthesis.

These and other features, aspects, objects and advantages of the present invention will become apparent after a review of the following detailed description of the disclosed embodiments and appended claims, in conjunction with the drawings described as follows.

DETAILED DESCRIPTION OF THE INVENTION

Figure 1:
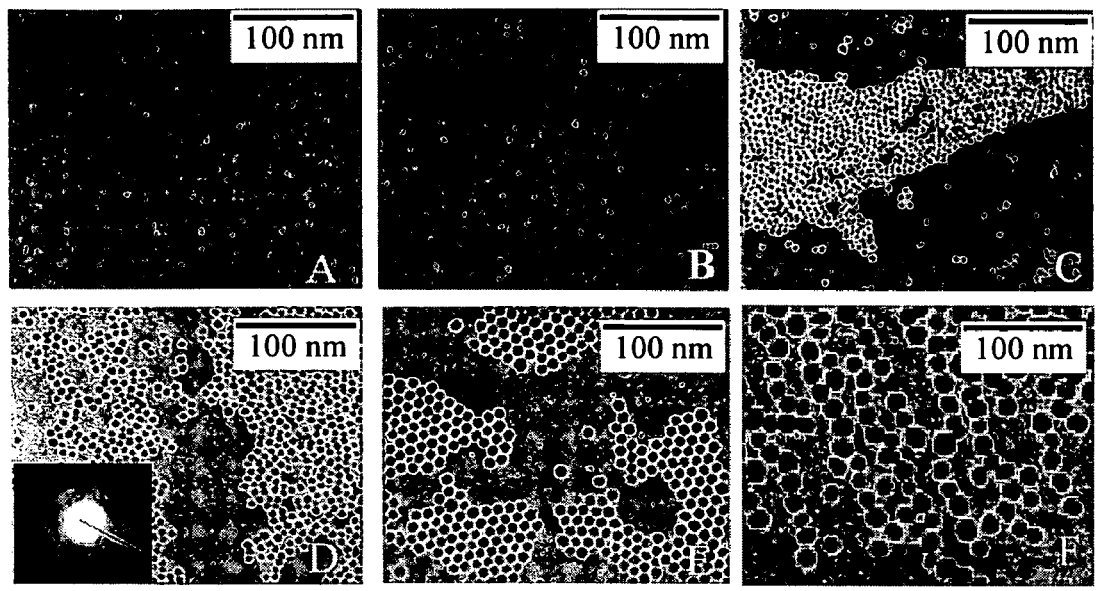
FIG. 1 shows TEM images of as-synthesized Au nanocrystals. A typical electron diffraction pattern of Au nanocrystals is shown as the inset in Panel D.

The present invention addresses many of the current limitations in nanocrystals by providing new compositions, methods, and articles of manufacture for a number of nanocrystalline materials having useful optical, magnetic, electronic, or catalytic properties.

Part I. Synthesis of Gold and Other Noble Metal Nanocrystals

The novel compositions of the present invention include, but are not limited to, substantially monodisperse nanocrystals of noble metals, e.g., gold, silver, copper, and platinum, wherein the nanocrystals are between about 1.0 and about 50 nm in diameter, more typically between about 1 nm and 20 nm in diameter.

The present invention contemplates a method of synthesizing substantially monodisperse noble metal nanocrystals. Such a method comprises combining in a single phase solvent system: (i) a noble metal complex, compound, or salt; (ii) at least one weak ligand for the metal complex; and (iii) at least one reducing agent; and isolating the nanocrystals from the solvent. Preferably, the noble metal complex or salt is selected from a complex, compound, or salt of gold, silver, copper, or platinum, and typically is a complex or salt of a halide or a carboxylate. A weak ligand is one that binds to the metal via one or more O or N atoms, and is preferably a fatty acid, an aliphatic amine, or a mixture thereof. A reducing agent is preferably a borohydride reagent, hydrazine reagent, or mixture thereof.

The single phase solvent system preferably contains a non-coordinating and non-aqueous solvent and can contain a surfactant to aid dissolution. A non-coordinating solvent for use in the present invention includes organic aliphatic and aromatic solvents. Particularly preferred are aromatic solvents such as toluene. A surfactant can be dissolved in the solvent and is preferably a long chain ammonium compound. A particularly preferred ammonium salt is didodecyldimethylammonium bromide (DDAB). A synthetic method of the present invention can also entail stirring, heating or sonicating the solution, as necessary, to facilitate dissolution of components.

A weak ligand for use in the invention is preferably a long chain aliphatic compound containing at least one O or N heteroatom, which binds to the metal ion. Without wishing to be limited to any particular theory, it is believed that the ligand serves to stabilize nanoparticle growth during reduction and facilitates formation of monodisperse particle populations. Exemplary ligands include aliphatic amines, fatty acids, and combinations of these. Some preferred ligands include dodecylamine, decanoic acid, etc., and mixtures of these. For purposes of this invention, ligands containing S atoms, such as thiols, that can bind to the noble metal are considered "strong ligands".

A reducing agent for use with the invention is preferably a borohydride reagent, hydrazine, or mixtures thereof. Other reducing agents that can be employed include hydrogen gas, hydrazine, hydrides, such as sodium hydride, lithium hydride, and lithium aluminum hydride, and borohydrides, such as sodium borohydride, and tetrabutyl ammonium borohydride (TBAB). Under elevated temperatures, amines, alcohols, and other organic molecules that can be oxidized can also be used as reducing reagents.

A synthetic method of the present invention can also include performing a ligand exchange on the as-synthesized noble metal nanocrystals, as desired. Such an exchange reaction is exemplified hereinafter. Formed nanocrystals can also be purified by repeated dispersion/dissolution and precipitation. Additionally, isolated nanocrystals can be grown to a larger particle size by the methods discussed herein.

A representative single-phase noble metal system is described below as follows. $AuCl_3$, $Ag(CH_3COO)$, anhydrous $Cu(CH_3COO)_2$, or $PtCl_4$ was dissolved in toluene with an ammonium surfactant. Either tetrabutylammonium borohydride (TBAB) or its mixture with hydrazine in toluene was used as the reducing reagents. Fatty acids or aliphatic amines were added as weak ligands. The reducing reagents were typically used in excess in order to convert metal precursors completely into nanocrystal form. This made it possible to estimate the number of nuclei for a reaction after the final particle size was determined, assuming no ripening at room temperatures. The reactions were typically carried out at room temperature, although heating treatments of the products were also studied.

FIG. 1 illustrates representative transmission electron microscope (TEM) images of the gold nanocrystals obtained using the single-phase approach. A plausible control over the size and size distribution of the nanocrystals is evident from this figure. Several strategies are applied to achieve this level of control. The concentration and chain length of the surfactants (and/or the weak ligands) played a role in determining the concentration of the nuclei formed in the solution, judged by the final average particle size. Similar to the synthesis of semiconductor nanocrystals in non-coordinating solvents, a high concentration of ligands or ligands with a bulky tail suppressed the activity of the monomers. Consequently, the number of nuclei formed was low, which results in relatively large nanocrystals. This strategy yields nearly monodisperse Au nanocrystals between 1.5 and 7 nm in size (FIGS. 1B, 1C, and 1D).

Figure 2:
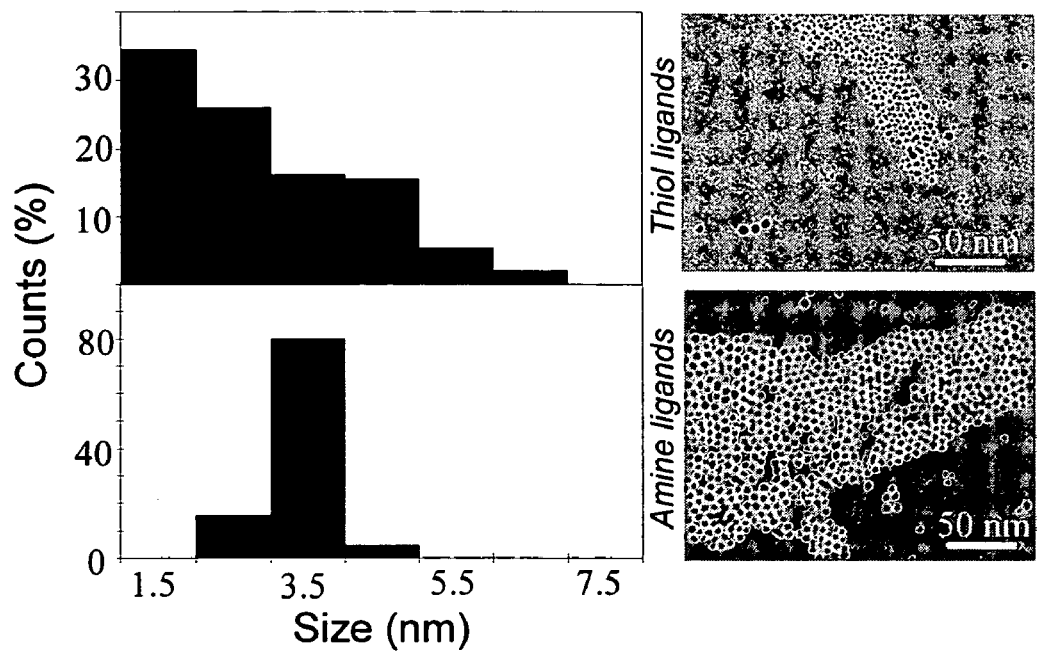
FIG. 2 shows the size distribution of Au nanocrystals formed with thiol (top) and amine (bottom) as the ligands.

Control experiments with thiols (strong ligands) in place of the weak ligands (amines or fatty acids) were performed. The average nanocrystal size was limited in the range between 1 and 3 nm, which is similar to the Brust method. The size distribution of very small-sized Au nanocrystals (FIG. 1A) synthesized using thiols was adequate, but the samples for relatively large nanocrystals all showed a significantly broader size distribution. These control experiments suggested the hypothesis that very strong ligands should be avoided for the synthesis of highly monodisperse noble metal nanocrystals. When the formed nanocrystals were coated by strong ligands, the subsequent growth at room temperature was hindered and the remaining monomers in the solution supported a continuous nucleation process, which resulted in samples being rich with very small particles. The final size achievable through the first strategy was limited to roughly smaller than about 7 nm. See FIG. 2.

A second strategy was developed for the synthesis of large nanocrystals, between about 6 and about 15 nm in size, by decreasing the reducing power of the reducing reagents. This strategy was acheived by replacing a part of TBAB—a strong reducing reagent—with hydrazine that is relatively weak at room temperature. Presumably, TBAB was mostly used for the nucleation and the weak ones were consumed in the growth stage. The final size of the resulting nanocrystals was increased by increasing the relative concentration of hydrazine. FIGS. 1E and 1F illustrate some nanocrystals synthesized by this strategy with the thermal treatment to be discussed later.

A third strategy was the secondary injection technique used in the synthesis of semiconductor nanocrystals (Murray, C. et al., ibid., Peng, X. et al., *JACS,* 1998, 120: 5343–5344), which is also similar to the seeding growth of noble metal nanocrystals (Murphy, C. et al., ibid.). In this strategy, small sized nanocrystals were formed using the first strategy. After this process, more reactants—metal precursor and reducing reagents—were added into the growth solution in a drop-wise fashion. The volume increase of the nanocrystals grown by this strategy roughly matched the amount of the metal precursors added in each injection, indicating an insignificant secondary nucleation. In contrast to the seeding growth, this entire synthesis was conducted in a one-pot fashion, although multiple-pot schemes also worked. The nanocrystals obtained in this way were similar to the ones grown by the second strategy.

Heating treatments of the reaction mixture without any purification were investigated for varying the size and size distribution of noble metal nanocrystals. For the single-phase approaches described here, thiol ligands were simply added into the final reaction mixture, in which the particle growth stopped at room temperature. The improvement of the size distribution was undoubtedly observed after the thermal annealing of the thiol-coated nanocrystals at about 120° C. (see FIG. 1E as an example). In all the heat treatments, the average nanocrystal size increased and a disappearance of the relatively small nanocrystals in the sample was observed when the size distribution of the nanocrystals was improved. This is similar to most observations in the literature and different from the systems studied by Klabunde's group (Lin, X., et al., *J. Nanopart. Res.,* 2000, 2: 157–164). Klabunde's group observed that the size distribution of the Au nanocrystals was improved along with a reduction of the average particle size.

Figure 3:
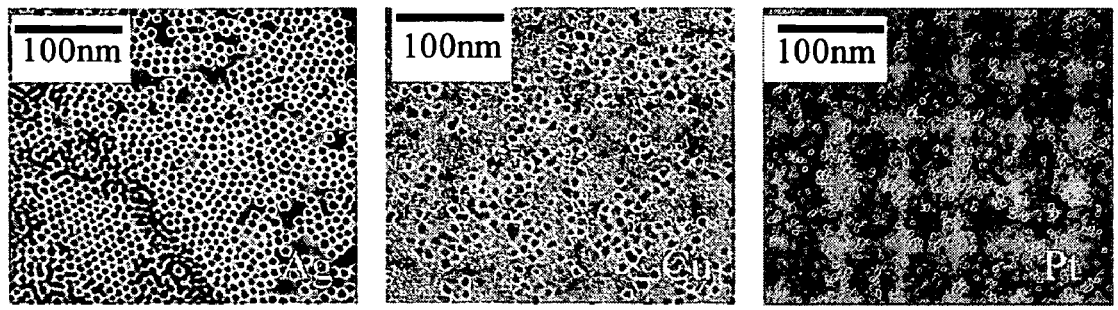
FIG. 3 shows TEM images of as-synthesized Ag, Cu and Pt nanocrystals.

The Au atomic concentration in the novel approaches described above was similar to that of the Brust method, and gram-scale quantity of nearly monodisperse nanocrystals can be readily synthesized. For instance, a reaction yielding 0.5 to 1.0 g of nearly monodisperse Au nanocrystals was performed in about 100 ml of toluene. It is also found that these new synthetic approaches can be extended to other noble metal nanocrystals, such as Ag, Cu, and Pt, as shown in FIG. 3. In contrast, the citrate reduction method in aqueous solution can only yield a few milligrams of Au nanocrystals in about 100 ml solution (Turkevich, J. et al. *Disc. Faraday Soc.* 1951, 11: 55–75), although the size distribution of the nanocrystals yielded by the citrate method is better than the Brust method.

Figure 4:
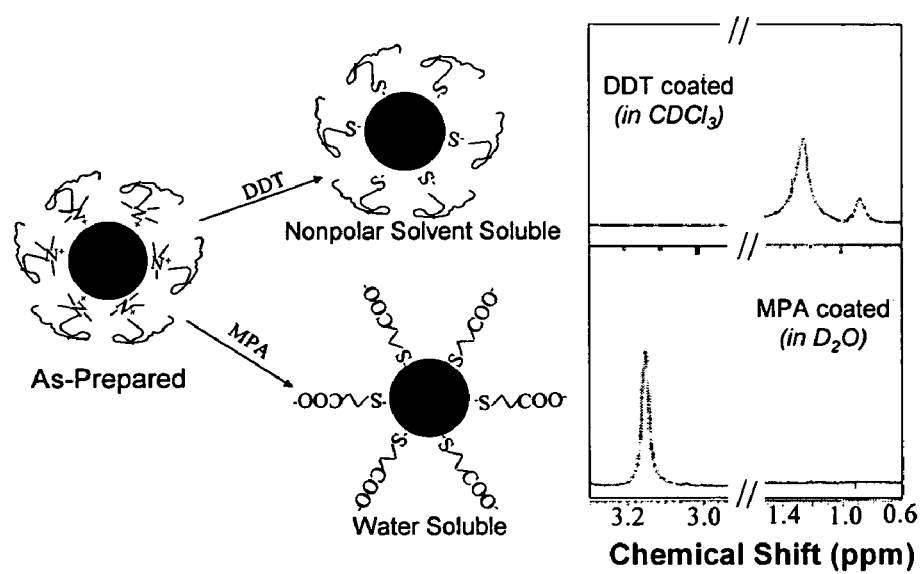
FIG. 4 illustrates schemes for the surface modification of Au nanocrystals (left panel) with dodecanethiol (DTT) and mercaptopropanic acid (MPA), and the $H^1$ NMR spectra of the resulting nanocrystals (right).

Various applications of nanocrystals may require that the surface ligands of noble metal nanocrystals be varied for certain purposes. For example, many bio-medical applications require water-soluble nanocrystals. Because weak ligands were used in the current synthetic schemes, surface modification of the Au nanocrystals was achieved by reacting the as-synthesized nanocrystals with strong ligands, such as thiols. Depending on the terminal groups of the thiols used, gold (Au) nanocrystals can be made to either maintain their hydrophobic nature or become water soluble (FIG. 4). To avoid significant growth of the nanocrystals during the ligand exchange process, a prompt purification of the modified nanocrystals was accomplished by precipitating the resulting nanocrystals from the solution containing excess thiol ligands. The characteristic peaks of the ligands in the NMR spectra (FIG. 4) are broad, indicating removal of the free ligands.

Thus, the size and size distribution control of Au and other noble metal nanocrystals in growth is shown to be feasible by adopting single-phase and one-pot approaches using weak ligands. This single-phase approach maintained the tunable activity for both metal precursors and the reducing reagents. The weak ligands on the surface of the as-synthesized nanocrystals also make it possible to vary the surface function of the nanocrystals as needed.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

EXAMPLE 1

Preparation of 1.5 nm Gold Particles in Presence of Thiol

An appropriate amount of didodecyldimethylammonium bromide (DDAB) was dissolved in toluene to make a stock solution with 100 mM concentration. Then, 7.5 mg of $AuCl_3$ was dissolved in 2.5 mL of DDAB solution by sonication leading to orange red color. Next, a dodecanethiol solution, prepared in toluene or DDAB solution, was mixed to the gold salt solution. In most experiments thiol and gold molar ratio was 1:1. The color of the solution turned to faint yellow within 1–2 minutes of adding the thiol. Finally, 25 mg of tetrabutyl ammonium borohydride (TBAB) dissolved in 1 mL DDAB solution was injected to the gold salt solution during stirring. A dark brown color appears immediately and is stable for more than 24 h.

The mole ratio of dodecanethiol to gold was varied from 0.1 to 10. Typically, the particle size was uniform when 1 to 5 times excesses thiol was used, with size between about 1.5 to 2.0 nm (see FIG. 1A as an example). Under other mole ratio conditions, the particles were typically polydispersed with a large range of sizes in each sample. See FIG. 2 for an example of this phenomenon.

EXAMPLE 2

Preparation of 1.5 nm Gold Particles in Presence of Tetrabutyl Ammonium Hydroxide Appropriately 7.5 mg of $AuCl_3$ was dissolved in 2.5 mL of DDAB/toluene solution by sonication, leading to orange red solution color. Next, 0.05 mL of tetrabutyl ammonium hydroxide (37% in methanol) was mixed into the gold salt solution and the color turned to faint yellow within 1–2 minutes. Finally, 25 mg of tetrabutyl ammonium borohydride (TBAB) dissolved in 1 mL DDAB solution was injected to the gold salt solution during stirring. A dark brown color appeared immediately and was stable for more than 24 h.

EXAMPLE 3

Preparation of 2 nm and 4 nm Gold Particles in Presence of Dodecylamine

In a typical preparation, 7.5 mg of $AuCl_3$ was dissolved in 2.5 mL of DDAB/toluene solution by sonication leading to orange red solution color. Then either 90 mg (for 4 nm size) or 18 mg (for 2 nm) of dodecylamine were dissolved by sonication. Finally, 25 mg TBAB dissolved in 1 mL DDAB solution was injected to the gold salt solution while stirring. A dark brown color appeared immediately and was stable for more than 24 h. TEM (transmission electron micrographs) of the 2 nm and 4 nm particles are shown in FIGS. 1B and 1C, respectively. When no amine was added, a particle of about 3 to 4 nm in size was produced with a relatively broader size distribution.

EXAMPLE 4

Preparation of 6 nm Gold Particles in Presence of Decanoic Acid

Procedure 1.

Approximately 43 mg of decanoic acid was dissolved in about 2.5 mL of toluene. Then 25 mg of TBAB dissolved in 1 ml of DDAB solution was mixed with the decanoic acid solution. Finally, 7.5 mg of $AuCl_3$ dissolved in 1 mL of DDAB solution was injected during vigorous stirring. The solution color changed to deep red within one minute of mixing, indicating particle formation. Particles were stable for more than 24 h. A representative TEM of 6 nm particles is shown in FIG. 1D.

Procedure 2.

Alternatively, 172 mg of decanoic acid was dissolved into 10 mL of toluene. Then 0.4 mL of 100 mM TBAB dissolved in DDAB solution was mixed with the decanoic acid solution. Finally, 0.2 mL of 50 mM $AuCl_3$ dissolved in DDAB solution was injected during vigorous stirring.

EXAMPLE 5

Size Controlled Preparation of 6–15 nm Gold Particles by Varying the Ratio of TBAB and Hydrazine 172 mg of decanoic acid was dissolved into 10 mL of toluene. Next, 3.2 microliter of anhydrous $N_2H_4$ was dissolved into decanoic acid solution by sonication. This solution was then mixed with varying volumes (0.3 mL, 0.25 mL and 0.2 mL) of the TBAB solution. (The dilute TBAB solution was prepared by dissolving 2.5 mg TBAB into 10 mL toluene.) Finally, 7.5 mg of $AuCl_3$ dissolved in 0.5 mL DDAB solution was injected and a deep red color appeared within 2–3 minutes of mixing. The particle sizes depended on the amount of TBAB added. Thus, about 6 nm sizes were obtained using 0.3 mL of TBAB, about 9 nm for 0.25 mL of TBAB, and about 15 nm for 0.2 mL of TBAB were formed. For the 9 nm and 15 nm particles, the size distributions were narrowed by boiling the particle dispersion in toluene (maintained at about 120° C.) for 30 min after dodecanethiol coating. Representative TEMs of particles prepared according to this procedure are shown in FIGS. 1E and 1F.

Reactions were performed using only hydrazine as the reductant, which resulted in polydispersed (from 2–8 nm) particles. Varying the concentration of hydrazine did not improve the size distribution, though it affected the average size somewhat.

The mixture of reducing agents made nearly monodisperse particles between about 6 and about 15 nm in size, with the size determined by the careful adjustment of the amount and the relative ratio of reducing agents, as follows. Using four equivalents of hydrazine provided excellent results, more than four equivalent providing polydisperse particles. While not intending to be bound by this statement, this observation probably reflects excess hydrazine initiating a parallel nucleation process along with borohydride. Using lower hydrazine amounts, more borohydride is required to initiate the reduction and those conditions produce polydisperse particle sizes with smaller average sizes that approach the sizes obtained using 100% borohydride. A further increase in particle size above about 15 nm and up to about 20 nm is also possible by further decreasing the borohydride amount, using similar experimental conditions as discussed above, but with a loss of monodispersity.

EXAMPLE 6

Size Controlled Preparation of 6–15 nm Gold Particles by Seeding Growth:

The dodecylamine-stabilized particles (4 nm) were prepared as disclosed above and to this solution (about 3.5 mL), 25 mL of a precursor gold salt solution was mixed. The gold salt solution was prepared by dissolving 75 mg $AuCl_3$, 500 mg DDAB, and 925 mg dodecylamine in 25 mL toluene by sonication until a clear yellow solution was obtained. Finally, 10 mL of $N_2H_4$ (0.2M) solution prepared in DDAB solution was added dropwise within a five-minute period during stirring. The solution color appeared deep red within 2–3 min. The 4 nm particles acted as seeds and grew into about 8 nm diameter particles without additional nucleation.

To prepare 15 nm gold particles, the as-prepared 8 nm gold particle solution was mixed with 50 mL of a precursor gold salt solution. This precursor gold salt solution was prepared by dissolving 750 mg of $AuCl_3$ and 5 g of DDAB dodecylamine in 50 mL of toluene by sonication, until a clear solution was obtained. Finally, 10 mL of $N_2H_4$ (0.2M) solution was added dropwise over a five-minute period during stirring. The 8 nm particles act as seeds and grew into 15 nm diameter particles without additional nucleation. Particles of intermediate diameter between about 4 and about 15 nm were prepared by varying the amount of precursor metal salt concentration.

EXAMPLE 7

Preparation of 7 nm Silver Particles

A 172-mg sample of decanoic acid was dissolved in 10 mL of toluene. Next, 3.2 microliter of anhydrous $N_2H_4$ was dissolved into decanoic acid solution by sonication. This solution was then mixed with 0.1 mL of dilute TBAB solution. (The dilute TBAB solution was prepared by dissolving 2.5 mg TBAB into 10 mL toluene.) Finally, 17 mg of silver acetate dissolved in 0.2 mL of dodecylamine solution (1M) in toluene was injected during stirring. A dark red color appeared within 5 min of mixing, indicating particle formation. Stirring was continued for 10–15 minutes until the reaction was complete. The solution was stable for more than 24 h. Particle size distributions were narrowed by boiling the particle dispersion in toluene for 30 min after dodecanethiol coating. A representative TEM of the particles prepared is shown in FIG. 3.

EXAMPLE 8

Preparation of 8 nm Copper Particles

A 86-mg sample of decanoic acid and 18 mg of anhydrous copper (II) acetate was dissolved in 5 mL toluene by heating under nitrogen atmosphere. Under boiling conditions, 5 mL of $N_2H_4$ (0.1 M) dissolved in a toluene solution with 0.1 M decanoic acid was injected and boiling was continued for the next 2 hrs. The solution color appears deep red and particles are reactive to open air (as evidenced by color change) unless coated with thiol. A representative TEM of the particles is shown in FIG. 3.

EXAMPLE 9

Preparation of 2 nm Platinum Particles

A 186-mg sample of dodecylamine was dissolved in 2.5 mL of toluene to make a clear solution. Then 8.5 mg of solid $PtCl_4$ was added to this solution and sonicated until a clear yellow solution formed. Next, 25 mg of TBAB dissolved in 1 mL of DDAB solution was injected to this solution during stirring. The solution color changed to black after 5–10 min of adding reducing agent. Stirring was continued for the next 30 min to complete the reaction. A representative TEM of the 2 nm particles obtained is shown in FIG. 3.

EXAMPLE 10

Scale-Up Synthesis for Noble Metal Nanoparticles

For a scale-up synthesis, a 2–3 times more concentrated metal salt solution (for example, 30 mM as compared to 10 mM as described above) was prepared in 100 mL of a DDAB/amine solution and the borohydride amount was increased accordingly. In a typical scaled-up synthesis of 2 nm gold nanoparticles, 900 mg $AuCl_3$ was dissolved in 100 mL of DDAB solution by sonication leading to an orange red solution color. Then, 2 g of dodecylamine was introduced and dissolved by sonication. Finally, 3 g of TBAB dissolved in 10 mL of toluene in the presence of 3 g of DDAB was added to the gold salt solution while stirring. A dark brown color appeared immediately and was stable for more than 24 h. A similar scaled-up synthesis strategy was also used in the other reactions and reaction conditions disclosed herein.

EXAMPLE 11

General Methods for Ligand Exchange:

Two methods were used for ligand exchange and nanoparticle purification. Whenever desired or necessary, the particle dispersions were boiled at 120° C. for 30 min after dodecanethiol coating, but before the purification steps.

Procedure I (for Hydrophobic Ligands).

The as-prepared nanoparticle solution was mixed with ligand solution (prepared in toluene or DDAB solution) and stirred for 10–15 min. In most experiments the thiol:gold molar ratio was about 1:1. The solution color changed from red to black upon thiol addition, indicating ligand exchange. Next, thiol coated nanoparticles were precipitated by adding a minimum amount of methanol/ethanol. After separating the precipitate from the supernatant, the precipitate was redissolved in toluene. The particle dispersion was subjected to this precipitation-redispersion scheme 3–4 times for further purification. The purified particles were finally dispersed into toluene, chloroform, water, or other solvents depending on the nature of ligand.

Procedure II (for Hydrophilic Ligands).

The ligand solution (about 0.1M) was prepared in methanol and the pH of the solution was adjusted to about 10 by adding tetramethylammonium hydroxide. The as-prepared nanoparticles were precipitated from solution by adding a minimum amount of methanol/ethanol and the colorless supernatant was discarded. Next, the ligand solution was slowly added to the precipitate and the precipitated nanoparticles were extracted into a methanolic solution of ligand. The particle dispersion was subjected to this precipitation-redispersion scheme 3–4 times for further purification. The particles were precipitated by adding minimum ethyl acetate and separating the precipitate from the supernatant. The precipitate was extracted into the methanolic ligand solution. The purified particles were finally dispersed into water or methanol depending on the nature of the ligand.

Part II: Synthesis of ZnSe and ZnS Nanocrystals

Colloidal semiconductor nanocrystals have been active targets for synthetic materials chemistry in the recent years due to their interesting size dependent properties and flexible processing chemistry. For example, the quality of CdSe nanocrystals provided by organometallic approaches and alternative approaches has reached a satisfactory level in many aspects, including size and size distribution control, shape control, and control on their emission properties. The introduction of non-coordinating solvents has recently assisted to boost the quality of CdS and CdTe nanocrystals to the same level of that of CdSe nanocrystals.

Despite the impressive success of cadmium chalcogenides systems and the similarity between cadmium chalcogenides and zinc chalcogenides, the quality of zinc calcogenides nanocrystals using alternative approaches is significantly lower than that of cadmium chalcogenides nanocrystals.

ZnSe (bulk bandgap 2.7 eV) and ZnS (bulk bandgap 3.6 eV) are wide bandgap semiconductors. Due to quantum confinement, their nanocrystals should be potentially interesting emitting materials in the blue to the ultra violet range. The wide bandgaps of these materials make them to be an ideal choice as inorganic passivation shell for a variety of semiconductor core/shell nanocrystals in order to improve the stability and emission properties of the semiconductor core nanocrystals with a relatively narrow bandgap. These wide bandgap semiconductor nanocrystals are also attractive hosts for the formation of doped nanocrystals.

Therefore, what is needed are methods to prepare high quality zinc calcogenide nanocrystals using alternative approaches in order to obtain the high quality nanocrystals required for many technological applications. Specifically, methods to control the size and size distribution of zinc calcogenide nanocrystals are needed, methods to control their shapes, and methods to control on their emission properties.

We have discovered and developed the synthesis of ZnSe and ZnS nanocrystals conducted in non-coordinating solvent. Octadecene (ODE) was used as the solvent for the injection solution by directly dissolving either elemental selenium or sulfur in it. For the selenium injection solution, about one equivalent of tributylphosphine (TBP) or trioctylphosphine (TOP) was reacted with the selenium powder first to make a clear solution, which was then diluted with a suitable amount of ODE. Tetracosane (TCA) and its mixture with ODE were used as the reaction solvent in most cases because of the typical high temperatures used for the formation of ZnSe and ZnS nanocrystals. Fatty acids and aliphatic amines were found as excellent ligands for the formation of ZnSe and ZnS nanocrystals. ZnO (dissolved by reacting with fatty acids) and zinc carboxylate salts were used as the precursors exclusively. Details of typical synthetic schemes for both ZnSe and ZnS nanocrystals are provided in the examples.

Figure 5:
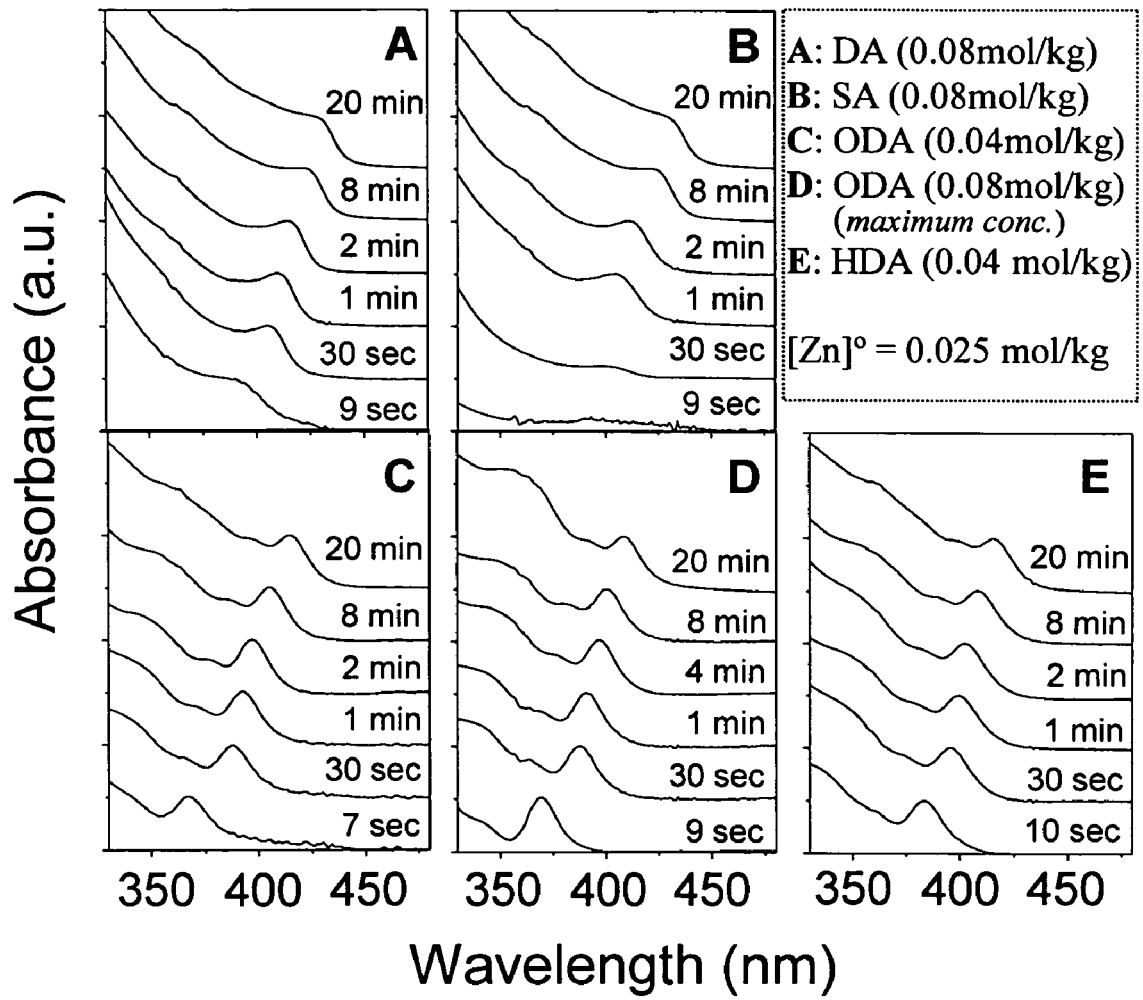
FIG. 5 shows growth kinetics of ZnSe nanocrystals with different ligands. The initial Zn:Se molar ratio was 1:6. The injection/growth temperatures are 330/310° C., respectively.

The synthesis of ZnSe nanocrystals in pure ODE (boiling point about 300–310° C.) as the non-coordinating solvent using only fatty acids as the ligands yielded nanocrystals with a good size distribution as we reported previously. Using zinc carboxylate salts, tetracosane (TCA) or its mixture with ODE was tested as the reaction solvent to increase the reaction temperature. A significant improvement was observed when the injection temperature and growth temperature were increased to 340° C. and 310° C., respectively. At these temperatures, the ligand effects were studied. As shown in FIG. 5, the growth of the nanocrystals was generally fast, which resulted in relatively large-sized nanocrystals, as judged by the first exciton absorption peak in the UV-Vis spectra, when fatty acids were used as the sole ligands. In addition, the sizes of the nanocrystals at the same reaction time decreased slightly by replacing dodecanoic acid (DA) (FIG. 5A) with stearic acid (SA) (FIG. 5B) as the ligands. This observation possibly reflects ligands with a relatively long hydrocarbon chain slowing down the reaction by increasing the steric effect of the monomers. However, the steric effect observed here was much less significant than that observed for other II–VI and III–V systems. In addition to varying the chain length of the fatty acids, the concentration of the ligands was also varied under fixing reaction conditions. It was observed that a high fatty acid concentration typically resulted in no formation of any nanocrystals, indicating the activity coefficient of the monomers became too low to initiate the formation of a necessary amount of nanocrystal nuclei. All of these results indicate that the zinc carboxylate precursors should typically be activated to achieve a desired balance between nucleation and growth.

Aliphatic amines were chosen as the reagents to activate the zinc carboxylate precursors. It was noticed that a grayish precipitate, possibly elemental zinc, appeared at elevated temperatures prior to the injection of selenium when the ratio between the aliphatic amine and the precursor was higher than about 6. (In the case of cadmium carboxylates, this ratio could be much higher.) Significant activation was observed as shown in FIGS. 5C–E. In comparison to the pure fatty acid-related reactions (FIGS. 5A and 5B), the starting size of the nanocrystals was much smaller, the concentration of the nanocrystals was higher, and the size distribution of the nanocrystals judged by the sharpness of the absorption peaks was significantly improved, at least for the relatively small sizes. These observations appear to indicate that a balanced nucleation and growth was achieved using the methods disclosed hereinabove.

One common belief in the synthesis of semiconductor nanocrystals under elevated temperatures is that the reaction temperature should decrease significantly after injection in order to stop the nucleation process promptly after the injection. Since the size range of the ZnSe nanocrystals grown with amine as the activation reagents was somewhat small (FIGS. 5C–E), we hypothesized that the system stayed at the nucleation stage for an extended period of time and the resulting particles were relatively small with a high yield. It is impractical to tune that by using relatively high amine concentrations because of the instability of the reaction system as mentioned above. In principle, a high growth temperature after the injection should promote a rapid growth of the nuclei formed immediately after the injection, yet in previous systems, such results have not been achieved. For this reason, the effects of injection/growth temperatures were studied.

Figure 6:
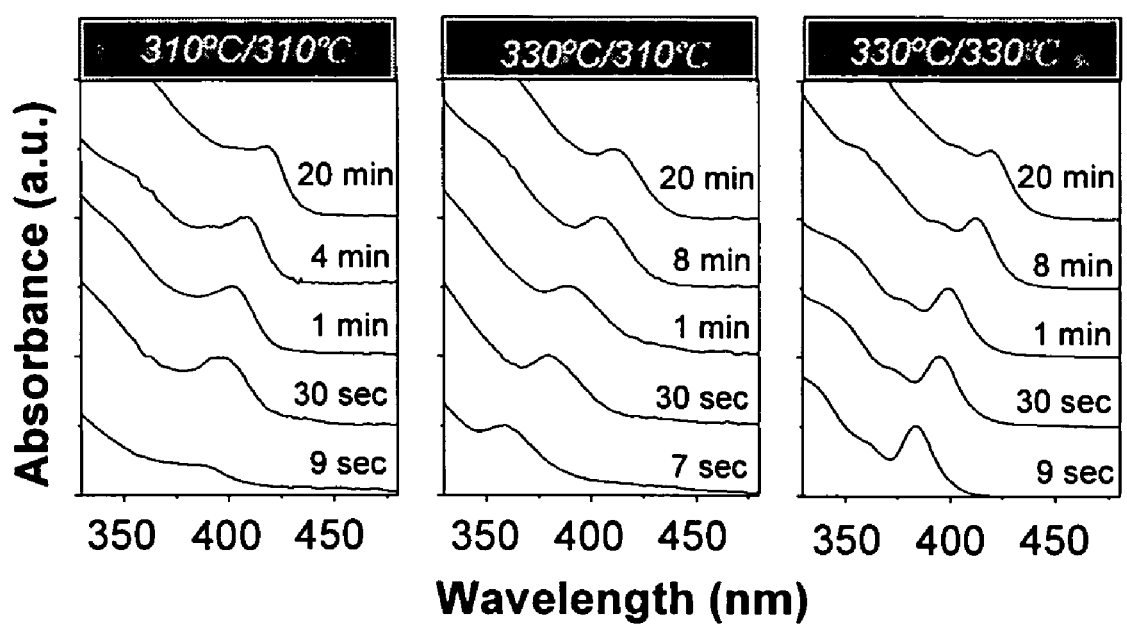
FIG. 6 shows the effects of injection/growth temperatures during the growth of ZnSe nanocrystals. Conditions: 0.025 mol/kg zinc stearate with 0.05 mol/kg ODA, Zn:Se-TBP molar ratio was 1:6.

Surprisingly, it was discovered that the size distribution of the resulting nanocrystals with equal and relatively high injection/growth temperatures (330° C./330° C., FIG. 6 right) was significantly narrower than that of the ones synthesized using a relatively lower growth temperature after the injection (FIG. 6, middle). The sizes of the resulting nanocrystals using equal and high injection/growth temperatures (330° C./330° C., FIG. 6 right) were larger than those obtained using the more traditional temperature combination (330° C./330° C., FIG. 6 middle) and those resulted from the reaction with equal and relatively low injection/growth temperatures (310° C./310° C., FIG. 6 left).

Figure 7:
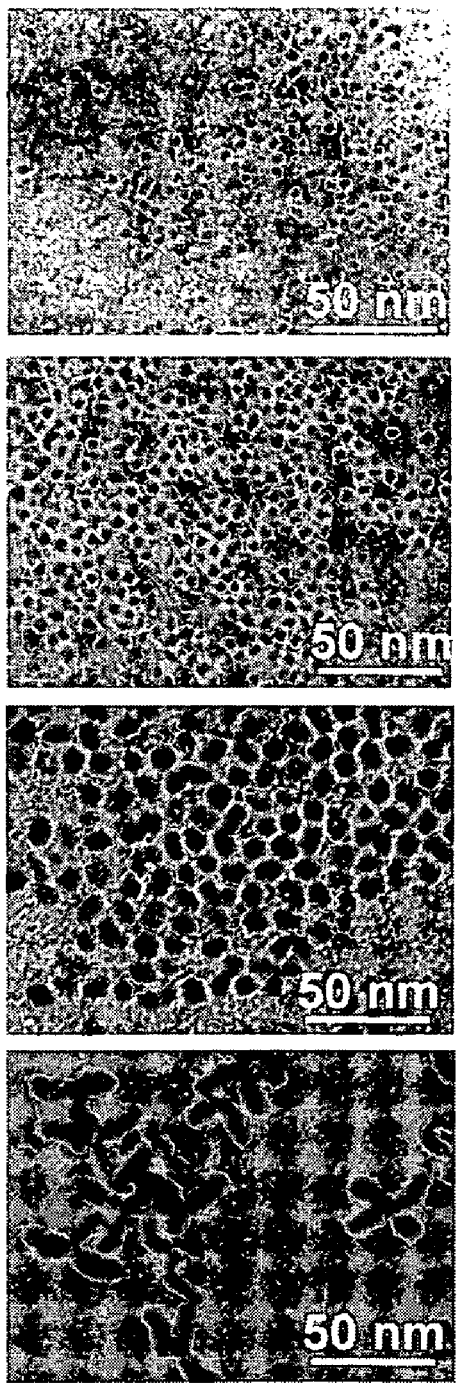
FIG. 7. Left: TEM images of as-prepared ZnSe nanocrystals. Right top: Collections of UV absorption and PL spectra of as-prepared ZnSe nanocrystals. Right bottom: XRD pattern of the ZnSe nanocrystals.
Figure 7:
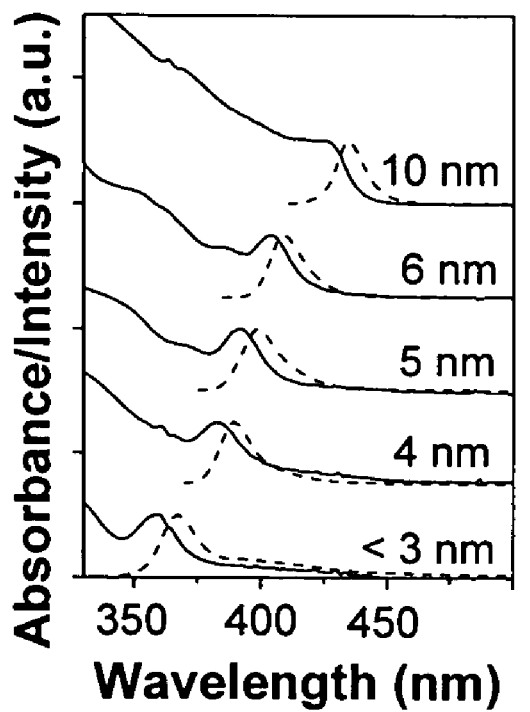
Figure 7:
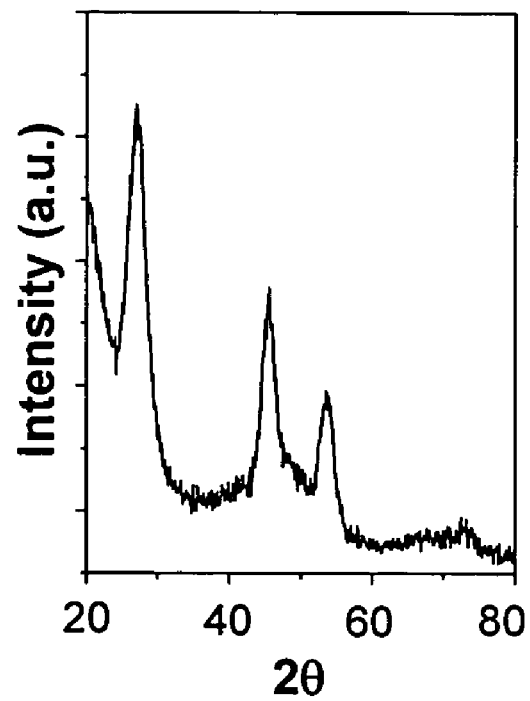

The photoluminescence (PL) of the ZnSe nanocrystals grown with fatty acids as the sole ligand was typically weak (PL quantum yield (QY) below 10%). However, the ZnSe nanocrystals grown with amines as activating reagents emitted very well, with PL QY as high as about 50%. As shown in FIG. 7 (top right), the PL was dominated by bandgap emission and the full width at half maximum (FWHM) of typical samples was about 12–15 nm. The narrow emission lines were consistent with the nearly monodisperse size distribution of the nanocrystals as demonstrated by the transmission electron microscope (TEM) images in FIG. 7. In addition to control over the size and size distribution, shape control was also evidenced with some preliminary results (FIG. 7, bottom right). The crystallinity of the ZnSe nanocrystals was demonstrated by the x-ray powder diffraction (XRD) as shown in FIG. 7. The XRD pattern of the nanocrystals resembles that of zinc blende crystals.

Figure 8:
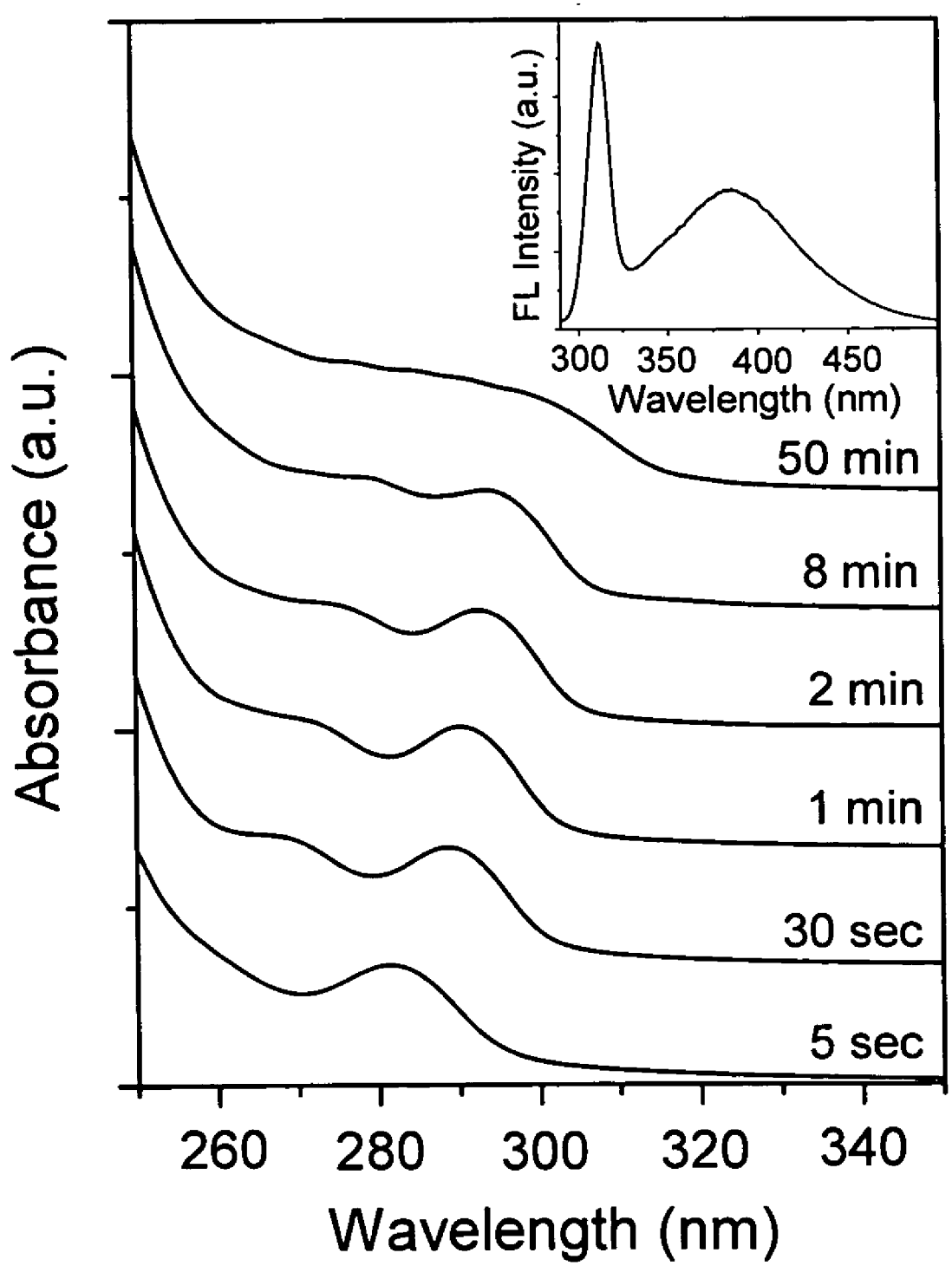
FIG. 8 shows temporal evolution of UV absorption spectrum of as-prepared ZnS nanocrystals. The [ZnSt] concentration was 0.025 mol/kg and the Zn:S molar ratio was 4:1. The injection/growth temperatures were 340/300° C. Inset: PL spectrum of the aliquots taken at 50 minutes.
Figure 9:
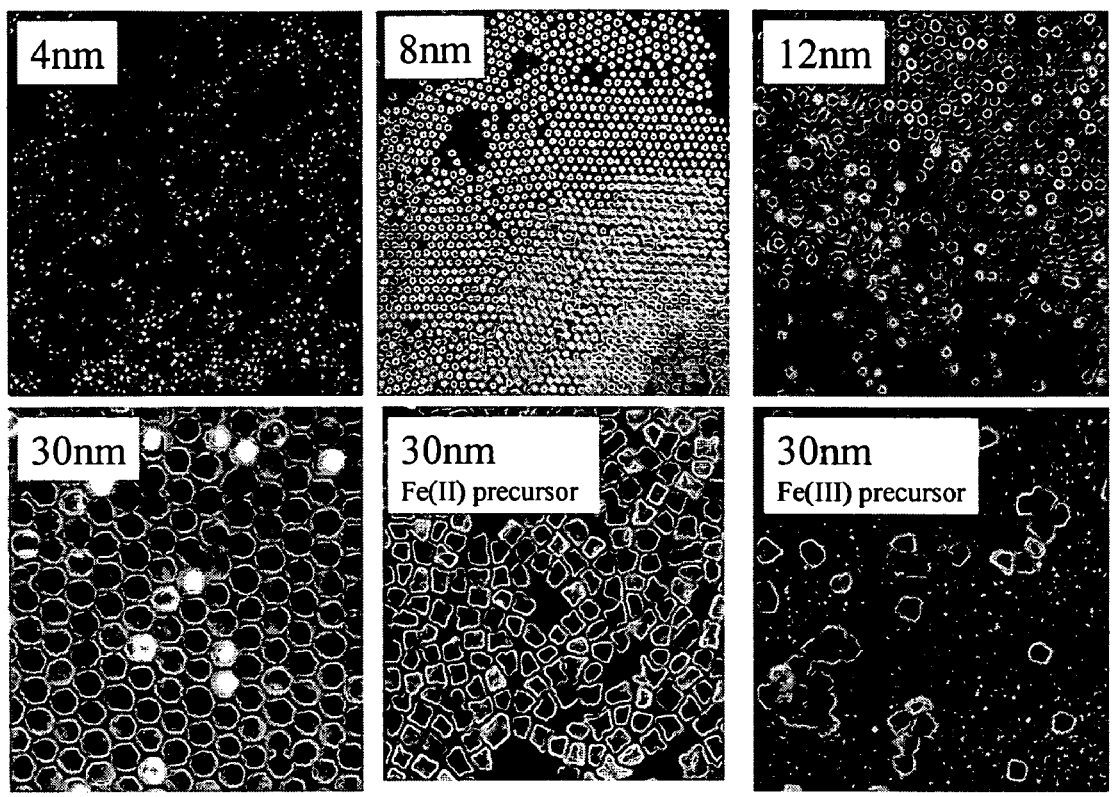
FIG. 9 shows TEM pictures of magnetic iron oxide nanocrystals with different sizes and shapes.

The synthetic chemistry of ZnS nanocrystals was discovered to be somewhat different from that of ZnSe nanocrystals. Without the activation of aliphatic amines, nearly monodisperse ZnS nanocrystals (FIG. 8) were formed using a traditional combination of injection/growth temperatures (340° C./310° C.). The PL of the ZnS nanocrystals synthesized using fatty acids as the sole ligand was found to be about 10 times brighter than those formed with the presence of aliphatic amines in the reaction solution although both types of ZnS nanocrystals showed significant contributions from deep trap emission (FIG. 8 inset).

Thus, nearly monodisperse ZnSe and ZnS nanocrystals were formed in non-coordinating solvents using alternative precursors. The window of the growth conditions of ZnSe and ZnS nanocrystals, including monomer and ligand ratio, ligand concentration, and reaction temperatures, was found to be much narrower than that of the corresponding cadmium chalcogenides nanocrystals. This observation may explain why nearly monodisperse zinc chalcogenides nanocrystals in the quantum confinement size regime have been extremely challenging targets for either traditional organometallic routes, the alternative routes, or the single-precursor routes.

Thus, the syntheses disclosed herein are different from the syntheses performed in coordinating solvents. That is, generic oxygen-containing ligands, such as fatty acids of a controlled concentration in non-coordinating solvents, were found to be good ligands for the formation of ZnSe and ZnS nanocrystals. The ligand effects on the PL properties of zinc chalcogenides nanocrystals resemble those for cadmium chalcogenides nanocrystals. For both types of chalcogenides nanocrystals, amines were found to enhance the PL of the selenide nanocrystals and fatty acids provided better electronic passivation for the sulfide nanocrystals.

EXAMPLE 1

General Experimental Details

Chemicals: Selenium (99.99%, 100 mesh), sulfide (99.98%, powder), zinc oxide, tributylphosphine (TBP, 97%), 1-octadecene (ODE), and decanoic acid (DA) were purchased from Aldrich, while zinc stearate ($ZnSt_2$), stearic acid (SA, 95%) and tetracosane (TCA) were from Alfa Asear. Hexadecylamine (HDA) and octadecylamine (ODA) were purchased from Lancaster Syntheis, Inc. Hexanes, methanol, and toluene were obtained from EM Sciences. All chemicals were used directly without any further purification.

Instrumentation: UV-vis absorption spectra were measured on HP 8453 diode array spectrophotometer. Photoluminescence (PL) spectra were examined on HITACHI F-2500 fluorescence spectrophotometer. PL quantum yield of samples were obtained using LD423 with known quantum yield (0.68 in ethanol) as the reference using reported method. Transmission electron microscopy (TEM) images were taken using a JOEL 100CX transmission electron microscope with 100 kV acceleration voltage. Formvar film coated grids (300 mesh) were used for the deposition of nanocrystals from their toluene solutions. Powder X-ray diffraction patterns were obtained using Philip PW1830 X-ray diffractometer (Cu Kα, radiation at 40 kV/40 mA).

EXAMPLE 2

Synthesis of ZnSe Nanocrystals

A typical procedure is as follows: Zinc stearate ($ZnSt_2$, 0.0632 g, 0.1 mmol) was mixed with 0.2 mmol (0.054 g) ODA and 2 g tetracosane and 2 g ODE in a 25 ml three-neck flask. This mixture was heated to 330° C. under an Ar flow. Selenium stock solution (0.048 g (0.6 mmol) of selenium powder dissolved in 0.2 g of TBP and 0.3 g ODE) was injected. After the injection, nanocrystals grew at 310° C. to reach the desired size. Aliquots were taken at different times to monitor the reaction. The resulting ZnSe nanocrystals can be dissolved in hexanes, chloroform, or toluene. Unreacted starting materials and side products were removed by the extraction and precipitation procedures reported previously. No size sorting was performed on any of the samples used for measurements reported here.

EXAMPLE 3

Synthesis of ZnS Nanocrystals

A typical procedure is as follows: Zinc stearate ($ZnSt_2$, 0.1264 g, 0.4 mmol) and a certain amount of tetracosane and ODE were loaded in a 25 ml three-neck flask. The mixture weight was 4 g in total and was heated to 340° C. under an Ar flow. A solution of sulfur (0.0032 g, 0.1 mmol) in 1 g of ODE was swiftly injected into this hot solution, and the reaction mixture was cooled to 300° C. to growth ZnS nanocrystals. This reaction is done to maintain the zinc-rich.

REFERENCES FOR PART II (1) Alivisatos, A. P. *Science* (Washington, D.C.) 1996, 271, 933–7.
(2) Peng, X. *Chemistry-A European Journal* 2002, 8, 334–339.
(3) Peng, X. *Advanced Materials* (Weinheim, Germany) 2003, 15, 459–463.
(4) Murray, C. B.; Norris, D. J.; Bawendi, M. G. *Journal of the American Chemical Society* 1993, 115, 8706–15.
(5) Peng, X.; Manna, U.; Yang, W.; Wickham, J.; Scher, E.; Kadavanich, A.; Allvisatos, A. P. *Nature (London)* 2000, 404, 59–61.
(6) Peng, Z. A.; Peng, X. *Journal of the American Chemical Society* 2001, 123, 1389–1395.
(7) Peng, Z. A.; Peng, X. *Journal of the American Chemical Society* 2001, 123, 183–184.
(8) Joo, J.; Na, H. B.; Yu, T.; Yu, J. H.; Kim, Y. W.; Wu, F.; Zhang, J. Z.; Hyeon, T. *Journal of the American Chemical Society* 2003, 125, 11100–11105.
(9) Lomascolo, M.; Creti, A.; Leo, G.; Vasanelli, L.; Manna, L. *Applied Physics Letters* 2003, 82, 418–420.
(10) Hines, M. A.; Guyot-Sionnest, P. *Journal of Physical Chemistry B* 1998, 102, 3655–3657.
(11) Jun, Y.-w.; Koo, J.-E.; Cheon, J. *Chemical Communications* (Cambridge) 2000, 1243–1244.
(12) Cumberland, S. L.; Hanif, K. M.; Javier, A.; Khitrov, G. A.; Strouse, G. F.; Woessner, S. M.; Yun, C. S. *Chemistry of Materials* 2002, 14, 1576–1584.
(13) Yu, W. W.; Peng, X. *Angewandte Chemie, International Edition* 2002, 41, 2368–2371.
(14) Battaglia, D.; Peng, X. *Nano Letters* 2002, 2, 1027–1030.
(15) Zhan, J. H.; Yang, X. G.; Zhang, W. X.; Wang, D. W.; Xie, Y.; Qian, Y. T. *Journal of Materials Research* 2000, 15, 629–632.
(16) Li, Y.; Ding, Y.; Qian, Y.; Zhang, Y.; Yang, L. *Inorganic Chemistry* 1998, 37, 2844–2845.
(17) Becker, W. G.; Bard, A. J. *Journal of Physical Chemistry* 1983, 87, 4888–93.
(18) Rossetti, R.; Hull, R.; Gibson, J. M.; Brus, L. E. *Journal of Chemical Physics* 1985, 82, 552–9.
(19) Kumbhojkar, N.; Nikesh, V. V.; Kshirsagar, A.; Mahamuni, S. *Journal of Applied Physics* 2000, 88, 6260–6264.
(20) Nanda, J.; Sapra, S.; Sarma, D. D.; Chandrasekharan, N.; Hodes, G. *Chemistry of Materials* 2000, 12, 1018–1024.

Part III: Synthesis of Magnetic Iron Oxide Nanocrystals

Magnetic iron oxide nanocrystals of high monodispersity were prepared according to the examples disclosed herein.

It was also discovered that the magnetic iron oxide nanocrystals could be further stabilized with the dendron ligands invented by us previously (Wang et al, JACS, 2001). The thermal and chemical stability of the resulting iron oxide dendron-nanocrystals are superior in comparison to traditional ligands with the same bonding sites to the surface of the nanocrystals (See FIG. 10). This stability strategy worked for iron oxide nanocrystals synthesized through other routes, too. This invention also encompasses the global cross-linking of the dendron ligands around each nanocrystal which should further enhance the stability of the nanocrystals.

Figure 10:
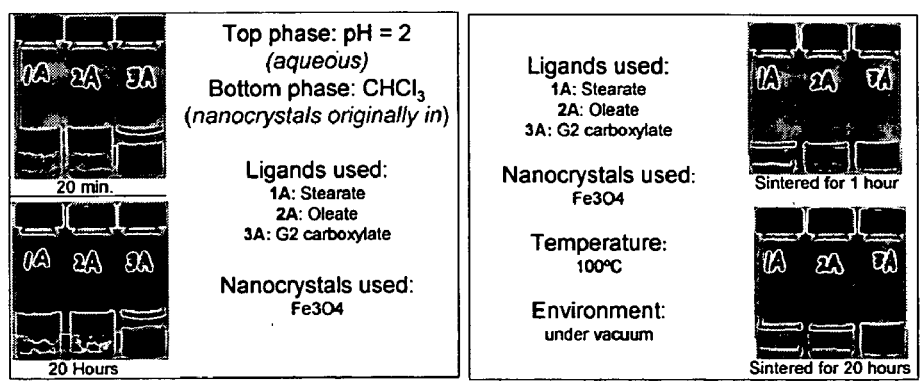
FIG. 10 shows superior stability of iron oxide dendron-nanocrystals in comparison to traditional single chain ligands with the same bonding sites. The G2 carboxylate ligand is a second generation dendron ligand with a carboxylate group at the focal point of the dendron as the bonding site. Similar results have been obtained using hydroxamate group as the bonding site.

FIG. 10 (left panel) illustrates that the iron oxide nanocrystals stabilized with the G2 dendron ligands can survive pH=2 environment (typical pH for the most acidic environment in human body—stomach) for at least 20 hours. In comparison, the iron oxide nanocrystals stabilized with stearate or oleate ligands could not even survive the same environment for 20 minutes. FIG. 10 (right panel) reveals that, after sintering 20 hours, the iron oxide dendron-nanocrystals were still soluble in a solvent, indicating no aggregation occurred during the sintering. In contrast, the stearate- or oleate-coated nanocrystals did not survive a one-hour sintering.

EXAMPLE 1

Preparation of Fe(II)/Fe(III) Oleate 5.4 g of $FeCl_3.6H_2O$ or 4 g $FeCl_2.4H_2O$ was dissolved in 100 mL of methanol and then oleic acid was added in three equivalents (17 mL, technical grade, 90%) for ferric salt and two equivalents (11 mL, technical grade, 90%) for ferrous salt. Next, 2.4 g (for ferric) or 1.6 g (for ferrous) of NaOH was dissolved in 200 mL of methanol and mixed drop-wise under the magnetically stirring condition. The observed brown precipitate was washed with methanol by 4–5 times and dried under vacuum for overnight to remove all solvents. The brown colored solid mass was dissolved in 20 mL of 1-octadecene (technical grade, 90%) at 60–70° C. and preserved (without precipitate) in room temperature for stock solution.

EXAMPLE 2

Preparation of Iron Oxide Nanocrystals

The iron oxide nanoparticles were prepared by the decomposition of iron-oleate complexes at 300° C. using octadecene as the solvent. The particle sizes could be controlled between about 8 and about 50 nm, by varying the amount of excess oleic acid, or by changing the concentration of precursor salt during the reaction. Other non-spherical shapes such as cubes or spheroids were also obtained by freezing the reaction at early stages. In a typical synthesis, 1 mL of the stock solution was mixed with 4 mL of octadecene and appropriate amount of oleic acid (from 0.1 equivalent to 10 equivalent) and the mixture was heated to 300° C. under an argon atmosphere. The reaction progress was monitored, taking a small portion of the sample in toluene in room temperature (and thus freezing the reaction) in different time interval and investigated this sample under TEM.

The final size and size distribution strongly depended on the starting reaction conditions as well as the freezing time of the reaction. Typically, for high quality nanoparticles the following conditions were employed 8 nm size: Start with ferric oleate, use 0.1 equivalent excesses oleic acid, that is, add 0.028 mL oleic acid (technical grade, 90%) and heat the reaction for 1 5–30 min.

12 nm size: Start with ferric oleate, use 1 equivalent excesses oleic acid, that is, add 0.28 mL oleic acid (technical grade, 90%) and heat the reaction for 15 min.

20 nm size: Start with ferric oleate, use 3 equivalent excesses oleic acid, that is, add 0.80 mL oleic acid (technical grade, 90%) and heat the reaction for 3 hs.

30 nm size: Start with ferric oleate, use 3 equivalent excesses oleic acid, that is, add 0.80 mL oleic acid (technical grade, 90%) and heat the reaction for 30 min. Alternatively, start with ferrous oleate, use 2 equivalent excesses oleic acid, that is, add 0.56 mL oleic acid (technical grade, 90%) and heat the reaction for 2 hs.

30 nm size cubic particles: Start with ferrous oleate, use 2 equivalent excesses oleic acid, that is, add 0.56 mL oleic acid (technical grade, 90%) and heat the reaction for one hour. Alternatively, start with ferric oleate, use 5 equivalent excesses oleic acid, that is, add 1.4 mL oleic acid (technical grade, 90%) and heat the reaction for 3 hrs.

EXAMPLE 3

4 nm Iron Oxide Nanoparticle Using Fe(II)—Stearate as Precursor

Using Fe(II)-stearate as precursor, the iron oxide nanoparticle of 3 nm can be prepared. In a typical synthesis, 0.622 g iron stearate and 0.269 g octadecylamine was mixed with 5 mL of octadecene and heated to 300° C. under argon atmosphere. The reaction was stopped after 15 minutes of heating.

EXAMPLE 4

Purification of Nanoparticles

Particles were precipitated using minimum methanol/acetone and precipitate was collected after centrifugation. Particles were then redispersed in toluene. The precipitation/redispesrion scheme was repeated for 2–3 times and finally dissolved in toluene and can be preserved for months.

The present invention has been described hereinabove with reference to certain examples for purposes of clarity and understanding. It should be apparent to the skilled observer that obvious improvements and modifications of the invention can be practiced within the scope of the appended claims.

What is claimed is:

1. A method of synthesizing nanocrystals of a noble metal comprising:
   (a) combining, in a single phase non-aqueous solvent system,
      (i) a noble metal complex, compound, or salt;
      (ii) at least one weak ligand selected from a fatty acid, an aliphatic amine, or a mixture thereof, or surfactant for the noble metal complex, compound or salt; and
      (iii) at least one reducing agent, to form an admixture thereof;
   (b) permitting said nanocrystals to form from the admixture; and
   (c) isolating the nanocrystals from the solvent system.

2. The method of claim 1, wherein the noble metal is gold, silver, copper, or platinum.

3. The method of claim 1, wherein the noble metal complex, compound, or salt is a halide or a carboxylate derivative of the noble metal.

4. The method of claim 1, wherein the at least one weak ligand is selected from decanoic acid and dodecylamine.

5. The method of claim 1, wherein the at least one reducing agent is an electropositive metal, a metal hydride, a borohydride reagent, hydrazine, or a mixture thereof.

6. The method of claim 5, wherein the borohydride reagent is tetrabutylammonium borohydride.

7. The method of claim 1, wherein the solvent system comprises a non-coordinating organic solvent.

8. The method of claim 7, wherein the non-coordinating solvent comprises toluene.

9. The method of claim 1, wherein the solvent system comprises a surfactant.

10. The method of claim 9, wherein the surfactant is didodecyldimethylammonium bromide.

11. The method of claim 1, wherein the at least one weak ligand selected from a fatty acid, an aliphatic amine, or a mixture thereof, is dissolved in a solution of the noble metal complex, compound or salt, prior to injecting the at least one reducing agent therein.

12. The method of claim 1, wherein the at least one weak ligand selected from a fatty acid, an aliphatic amine, or a mixture thereof, and the at least one reducing agent are admixed in a solution prior to injecting a solution of the noble metal complex, compound or salt therein.

13. The method of claim 1, further comprising boiling the admixture after coating with a sulfur-containing ligand to narrow the particle size distribution.

14. The method of claim 1, further comprising heating or sonicating the admixture to aid dissolution of one or more reagents.

15. The method of claim 1 further comprising exchanging at least one weak ligand selected from a fatty acid, an aliphatic amine, or a mixture thereof, bound to as-prepared nanocrystals with a sulfur-containing ligand prior to isolating said nanocrystals.

16. The method of claim 1, further comprising purifying said isolated nanocrystals by repeated dispersion and precipitation of the nanocrystals in a solvent.

17. The method of claim 1, further comprising growing isolated nanocrystals by (i) combining said isolated nanocrystals with a second admixture of noble metal complex, compound or salt, and at least one weak ligand selected from a fatty acid, an aliphatic amine, or a mixture thereof, and (ii) adding at least one reducing agent thereto.

18. The method of claim 1, wherein the isolated nanocrystals have a particle size in a range of about 1 nm to about 20 nm.

19. The method of claim 1, wherein the isolated nanocrystals are substantially monodisperse.

* * * * *